Oct. 27, 1964

D. A. GHERSI

REMOTE STATION SIGNALLING CIRCUIT HAVING CIRCUIT MAINTENANCE 3,154,775

Filed Sept. 25, 1961

2 Sheets-Sheet 1

Oct. 27, 1964 D. A. GHERSI 3,154,775

REMOTE STATION SIGNALLING CIRCUIT
HAVING CIRCUIT MAINTENANCE

Filed Sept. 25, 1961 2 Sheets-Sheet 2

United States Patent Office 3,154,775

Patented Oct. 27, 1964

3,154,775

REMOTE STATION SIGNALLING CIRCUIT HAVING CIRCUIT MAINTENANCE

Dominick A. Ghersi, New York, N.Y., assignor to American District Telegraph Company, Jersey City, N.J., a corporation of New Jersey Filed Sept. 25, 1961, Ser. No. 140,572
16 Claims. (Cl. 340—292)

Figure 1:
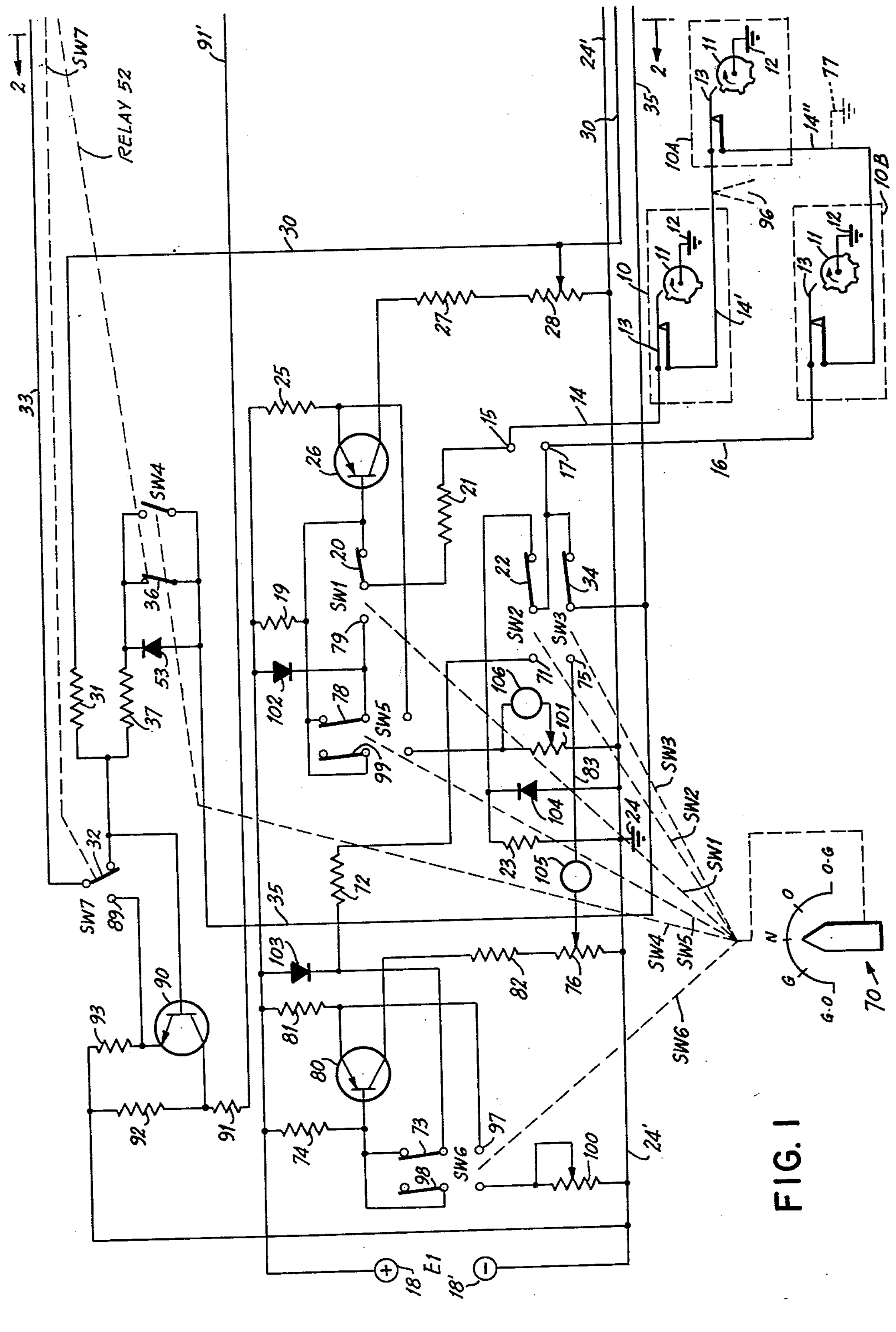

The present invention relates to signalling circuits, and more particularly to signalling circuits of the type employed to provide central station electrical protection services.

In the rendering of electrical protection services against the hazards of fire or burglary and for the supervision of industrial processes and the activities of watchmen, it has been customary to provide one or more electrical protection or supervisory devices at the premises where the service is to be rendered and to connect the premises electrically to a central station. The central station may be the guard headquarters of a large industrial plant, a fire house or any central location where trained personnel are on duty to receive signals from the connected premises and to initiate appropriate action in response thereto.

Under some circumstances it is desirable to provide a direct wire from each premise to an individual signal indicating means at the central station, the wire connection being usually a telephone line leased for the purpose. Such operation, however, is expensive due to the high cost of leasing many telephone lines and the duplication of the signal indicating devices at the central station. Thus it is a common practice to connect a number of premises to a single telephone line and to use a common signal recording device employing a system of coded signals to identify the individual source of the signal. The usual procedure is to provide the protection or supervisory device with a rotatable signal wheel having teeth arranged in a desired pattern so that, upon actuation of the device, the wheel is caused to rotate and the teeth alternately ground and open the telephone line, thereby producing variations in the electric current normally flowing therethrough. The current variations so produced operate a register device at the central station, causing it to print a facsimile of the tooth pattern on a paper tape. The tooth pattern of each signal wheel on a given circuit is unique and so enables the central station operator to identify the source of any signal thus received. Such circuits may contain as many as a dozen signalling devices in premises located miles apart and connected to the central station through several telephone exchanges.

Experience with telephone lines has shown that the lines may become open or grounded, or both, under field conditions. Yet in the rendering of electric protection services, the continuity of service to the subscribers is of paramount importance. The circuits at the central station therefore are so arranged that, by appropriate switching operations, service can be maintained even though the line may be open, grounded, or some combination of the two faults. The so-called McCulloh circuit, as exemplified by United States Patents Nos. 253,080, 2,254,398 and 2,398,594, is typical of this type of operation and has provided excellent quality service for many years. However, the McCulloh circuit is subject to certain deficiencies. Under varying weather conditions, the changing electrical leakage, especially on the longer lines, has made the proper adjustment of the circuits exceedingly difficult to accomplish. Another problems has been that the inherent inertia of the moving parts of the electromechanical relays employed has placed severe limitation on the speed of the signals that may be received and so restricts the general usefulness of the circuit. Again, the electromechanical devices associated with such circuits have had limited service lives and have been basically large in size, a distinct disadvantage when, as is usual, large numbers of such devices are mounted in a limited space.

A further problem has been that the usefulness of such protection circuits has been limited by the electrical resistance of the telephone lines which, as the length of the lines is extended, reduces the current therethrough to a point where operation may not be sustained. The usefulness is similarly limited by the sensitivity or the ability of the central station apparatus to respond to a signal when the strength of the signal varies only slightly from the normal current through the lines. Sensitivity is of particular importance to the maintenance of service over telephone lines that have become short circuited at some point distant from the central station.

The principal object of the invention has been to provide a novel and improved signalling circuit.

Another object of the invention has been the provision of a novel and improved circuit which overcomes the foregoing and other disadvantages formerly encountered with the McCulloh type of circuit.

A further object of the invention has been to provide a novel signalling circuit which may be manually adjusted to permit continued operation in the event of various troubles in the line and which will continuously automatically adjust itself to be at all times in the most sensitive condition to receive signals.

Another object of the invention has been to provide a signalling circuit capable of operation over lines longer than previously possible and under short circuit conditions.

A still further object has been the provision of a circuit of the above type which is capable of receiving rapidly transmitted signals.

A feature of the invention has been the provision of special annunciation means to indicate a condition of excessive line leakage or other trouble which renders the receipt of signals impossible.

An additional feature has been the channeling of signals under normal line conditions to provide for the receipt of either a break signal or a ground signal but not both.

Still another feature has been provision for the operation of the circuit at a selected one of the various line voltages in common use.

Figure 2:
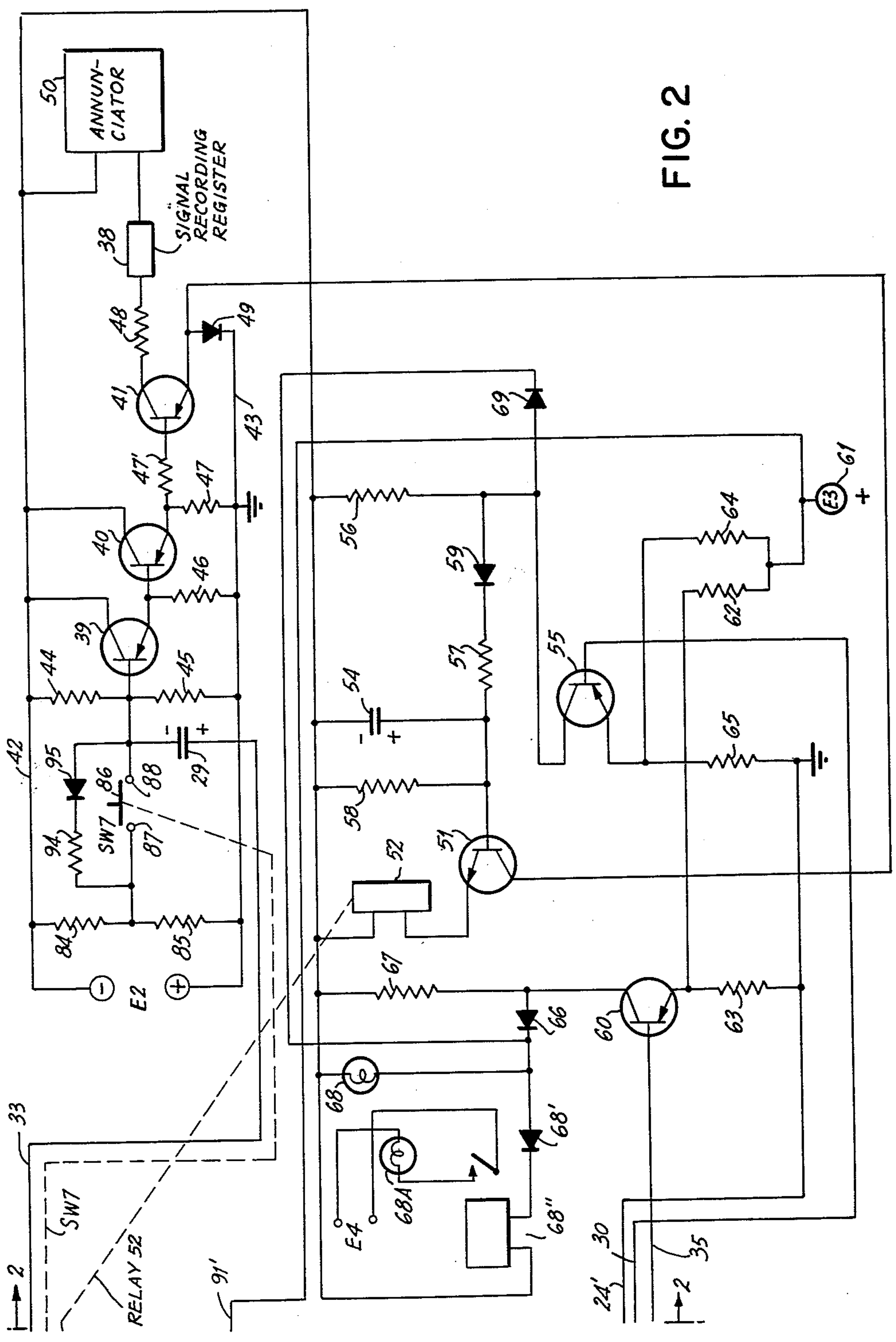

Other and further objects, features and advantages of the invention will appear more fully from the following description of the invention taken in connection with the appended drawings, in which:

FIGS. 1 and 2, when joined along the line 2—2 form a schematic diagram illustrating one embodiment of the invention shown in the normal operating condition.

Referring now to the drawings, reference numerals 10, 10A and 10B each represents an electric protection circuit of the type described for connecting at least one protection or supervisory device to a central station. Each device has a signal wheel 11, grounded at 12, and is provided with a break contact 13. A conductor 14 interconnects a jack 15 at the central station and contacts 13 of device 10. A conductor 14' interconnects contacts 13 of device 10 and contacts 13 of device 10A. Similarly a conductor 14'' interconnects contacts 13 of device 10A and contacts 13 of device 10B. A conductor 16 interconnects contacts 13 of device 10B and a jack 17 at the central station. Thus the various contacts 13 are interconnected in a series loop between jacks 15 and 17. The devices 10, 10A and 10B may be located at different premises and the interconnecting conductors 14, 14', 14'' and 16 may be leased telephone wires. These conductors might be several miles in length and might be connected through several telephone exchanges (not shown).

In the conductive loop between jacks 15 and 17 only three protection signalling devices 10, 10A and 10B are shown, but it should be understood that additional protection signalling devices could be and usually would be included in the series loop.

Power for the circuit is supplied from a source E1 which might be from 52 to 130 volts, direct current, as required to produce the desired line current which might be about 15 milliamperes, in lines of varying electrical characteristics. The basic loop circuit may be traced from positive terminal 18 through a resistor 19, armature 20 of a switch SW1, a resistor 21, jack 15 and out telephone line 14, through the series connected contacts 13 and the return telephone line 16 to jack 17, armature 22 of switch SW2 and through a resistor 23 to ground at 24. Negative terminal 18′ is connected to ground at 24 through a conductor 24′. Positive potential is also supplied from terminal 18 through a resistor 25 to the emitter of a transistor 26 which might be a PNP transistor of the 2N398 type. The collector of transistor 26 is connected through resistor 27 and potentiometer 28 to ground. The base bias voltage established by resistor 19 permits the transistor 26 to conduct through the collector circuit and the flow of current therethrough creates a voltage drop across the potentiometer 28.

The voltage at the slider of potentiometer 28 is applied to a condenser 29 through a conductor 30, a resistor 31, armature 32 of switch SW7 and a conductor 33. Condenser 29 might conveniently be a tantalum condenser of 30 volts–200 mfd. capacity. The resistor 27 has been provided in series with potentiometer 28 as a safety feature to protect condenser 29 from excess voltage should potentiometer 28 be inadvertently adjusted below a safe value.

The current from the return telephone line 16 creates a voltage drop across the ground return resistor 23 which is applied to condenser 29 through armature 22 of switch SW2, armature 34 of switch SW3, conductor 35, a relay contact 36, a resistor 37, armature 32 of switch SW7, and conductor 33.

Condenser 29 is coupled to a signal recording register 38 through a double emitter follower circuit of the Darlington type consisting of transistors 39, 40 and power amplifier transistor 41 together with their associated circuitry. Transistor 39 (which might be a PNP transistor of the 2N495 type) and transistor 40 (which might be a PNP transistor of the 2N1305 type) are coupled across E2, a D.C. source which might be 18 volts, with their collectors connected to the negative terminal through conductor 42 and their emitters coupled to the positive terminal through a conductor 43. Conductor 43 is connected to ground so that source E2, unlike source E1, has a positive ground. The base of transistor 39 is connected to the junction of voltage divider resistors 44 and 45. The emitter of transistor 39 is coupled to positive potential through resistor 46 and is connected directly to the base of transistor 40. The emitter of transistor 40 is coupled to the grounded positive conductor 43 through a resistor 47, and, through a resistor 47′, to the base of power transistor 41 (which might be a PNP transistor of the 2N1184 type). The collector of transistor 41 is connected through a resistor 48 to the register 38 while the emitter is connected through Zener diode 49 to the grounded positive conductor 43. Register 38 may be of the standard type which will print ink dashes on a moving paper tape corresponding to the pattern of the teeth on the signal wheel of the protection or supervisory device being actuated. It is, however, evident that other types of signal recording apparatus may be employed to equal advantage. The register 38 is connected to visual and auditory signal annunciation means 50 which follow the operation of the register 38 and which serve to draw the central station operator's attention to the fact that a signal is being recorded. Normally, a number of protection circuits would be connected to a common annunciator.

When a protection circuit at a particular subscriber's premises is actuated, the corresponding code wheel 11 will start to rotate, as is well known in the art. Rotation of any code wheel 11 in the circuit will ground the line as a tooth first contacts the operating member of a contact 13, then open the contact as the operating member rides up the tooth and then return the line to normal during the interval before the next tooth is presented. Ground and break signals are thereby produced for each tooth on the wheel and the coded pattern thereof, as established by the number and spacing of the teeth, provides a distinctive signal indication whereby the particular signal wheel then transmitting may be identified.

A ground appearing on the loop circuit between jacks 15 and 17 will result in a decrease of the normal current flowing through the ground return resistor 23 and a corresponding decrease in the voltage drop across resistor 23 which is transferred to condenser 29 via the circuit path previously described. A break in the loop circuit decreases the current through the base resistor 19 which in turn reduces the current through the collector of transistor 26 and thereby quickly reduces the voltage drop across resistor 28. This decrease in voltage is likewise transferred to the condenser 29 via the circuit path previously described. A line break also reduces the current through the ground return resistor 23 which is also transferred to condenser 29.

The decrease in voltage at the positive side of condenser 29 permits a small current to flow which changes the base bias of transistor 39 thereby increasing the current in the emitter circuit thereof which in turn energizes transistor 40. When the voltage drop across resistor 47 in the emitter circuit of transistor 40 exceeds the Zener voltage of diode 49, which might be about 8 volts, the power transistor 41 will conduct and allow sufficient current to flow to actuate the register 38 and print a signal indication on the paper tape. The collector to emitter breakdown voltage of power transistor 41 is selected to be much greater than any transient voltages which might be expected to occur across the inductances of the coils in register 38 thus avoiding any possibility of false signals from that source.

The input impedance of the double emitter follower circuit is high, about 750,000 ohms, and the capacitance of condenser 29 is as large as is practical, e.g., 200 mfd. so that their time constant will be relatively long, e.g., 150 seconds. Thus the relatively swift break and ground impulses from a signal wheel, which may vary from 150 to 500 milliseconds in duration, will not affect the voltage across the condenser 29. Slow changes in line leakage as may result from varying weather conditions will gradually change the voltage across resistors 28 and 23 and consequently that across condenser 29. Because the emitter follower circuit requires but little energy from the condenser 29 (which has the capacity to store considerable energy), the circuit is inherently in a condition to receive signals even though line leakage has produced a sizable reduction in the voltage at condenser 29. The ability of the circuit to so condition itself automatically as to avoid the effects of varying line leakage is of great practical importance in the operation of a central station since it avoids the necessity for continual difficult manual adjustments to the circuits.

In prior systems, the current variations produced in the loop circuit were applied directly to relays which controlled the recording device and signal annunciating means. Obviously there had to be a sizable difference between the normal line current and the signal currents to enable proper functioning of the relays. As the length of the telephone lines is increased, the corresponding increase in leakage and other electrical problems reduce the signal-to-normal current ratio to a point where the relays will not function reliably and so determine the practical operating range of a central station. Experience has established 10 milliamperes as about the smallest normal current which will provide the desired degree of reliability for the operation of a circuit.

The present invention, however, does not directly apply the circuit currents to the signal receiving apparatus. Instead, the circuit current variations indicating signals are used to trigger a separate network, operating under an individual and constant power supply. Thus it is possible to achieve satisfactory operation with a much smaller signal-to-normal current ratio than previously possible. It has, in fact, proved feasible to operate with normal currents as low as seven milliamperes, which represents an increase of about one third in the practical telephone line length or double the circular area that may be served by a centrally situated central station.

It is evident from the circuits as thus far described that breaks and grounds on the circuit 10 will cause a decrease in the voltage drop across resistors 28 and 23, respectively, which, when transferred to the condenser 29, will result in operation of register 38 and a signal printed on the tape. Thus, the normal operation of a grounded signal wheel 11 would produce a double signal (both breaks and grounds) on the tape—an obviously obviously undesirable occurrence. To avoid such a double signal, there is provided a transistor 51 (which might be an NPN transistor of the 2N1304 type) connected as an emitter follower, a relay 52 having a normally closed contact 36, a diode 53 and a condenser 54 (which conveniently might be of 10 volts—200 mfd. capacity). This circuit permits only one signal (the break) to be received at one time by the register. The collector of transistor 51 is coupled to the emitter of the power amplifier transistor 41 which serves to control the voltage applied to the relay 52 located in the emitter circuit of transistor 51. The base of transistor 51 is connected to the junction of resistors 57 and 58 and condenser 54. The relay 52 is preferably of the magnetically biased reed type provided with an external coil, which, when energized, produces sufficient flux to overcome the biasing magnet and open the contact. The relay is designed to obtain small physical size and a rapid operating time of about one half millisecond thereby making possible the receipt of swiftly transmitted coded signals. Operating power for relay 52 is obtained from conductor 42.

When the first break signal appears on circuit 10, the consequent decrease in voltage drop across resistor 28 permits a transistor 55 to saturate as will be more fully explained hereinafter. The current flow thus produced creates a voltage drop across collector resistor 56, which, in turn, charges condenser 54 immediately. The series connected resistor 57 is provided to limit the initial surge current. The emitter follower transistor 51 allows the voltage to the coil of relay 52 to follow the voltage across condenser 54 with the result that relay 52 will be energized and stay energized until condenser 54 has discharged through the parallel connected resistor 58. A diode 59 is provided to prevent a reverse current flow.

The energization of relay 52 opens contact 36 thereby preventing the voltage decreases which appear across the ground return resistor 23 from reaching condenser 29 and consequently operating the register. The values of condenser 54 and resistor 58 may be selected to produce a time constant of about 10 seconds, so that the occurrence of the first break signal immediately suppresses subsequent ground signals and furthermore prevents the transmission of a ground signal for a period of about 10 seconds following the last break signal of a code transmission. This allows the circuits ample time to return to a stable state before they are permitted to again receive ground signals. The diode 53 is provided to shunt contact 36 so that the condenser 29 may receive a steady charging current from ground return resistor 23 when contact 36 is open without permitting a discharge path to exist for condenser 29.

It should be noted that when a signal wheel 11 starts to rotate, the first signal produced is a ground signal. The break signal does not occur until the tooth has lifted the operating member sufficiently to open the contact 13 whereas the ground signal appears immediately the tooth touches the operating member. Thus, the initial ground signal will be printed on the tape by register 38 closely followed by the first break signal which operates as explained above to suppress any further ground signals. In practice, the first break signal follows the first ground signal without interruption, and hence is printed on the tape as a single, elongated dash and so does not hinder the reading of a signal from the tape.

Should an abnormal line condition such as a break or ground, or some combination thereof, occur and persist for some time, the signal would pass through condenser 29 and register 38 would run continuously, printing a single long line, until the condenser 29 was completely discharged. Apart from the waste of tape, such a condition is most undesirable because the circuit thereafter would be inoperative and supervision of the line would be lost. In a busy central station, the continuous running of a register for several minutes might well be overlooked, hence a visual annunciation feature has been provided as follows.

Transistors 60 and 55 (which might be PNP transistors of the 2N1375 type) are forwardly biased by a source E3 of positive potential of, say, 52 volts connected to the circuit at a jack 61. The voltage is applied to the emitter of transistor 60 by voltage divider resistors 62 and 63 and to the emitter of transistor 55 by voltage divider resistors 64 and 65. The base of transistor 60 is coupled to the high end of ground return resistor 23, while the base of transistor 55 is coupled to the slider of potentiometer 28. The collector of transistor 60 is connected to the junction of a diode 66 and a resistor 67, which shunts a lamp 68. The collector of transistor 60 is connected to the junction tion of resistor 56 and diode 59 and is coupled through a diode 69 to the lamp 68. Transistors 60 and 55 will be in a saturated condition, i.e., fully short circuited, if no voltage exists on their respective bases.

A break occurring in the loop circuit will result in the loss of the voltage drop across resistor 28 and a corresponding loss of base bias voltage on transistor 55 which then becomes conductive through the collector circuit and diode 69 to light lamp 68. In like manner, a break in the loop circuit also results in the loss of the voltage drop across the ground return resistor 23 thereby causing transistor 60 to become conductive also lighting lamp 68 through the diode 66. A ground on circuit 10, however, affects only the ground return resistor 23, lighting lamp 68 via transistor 60 and diode 66. A resistor 67 is provided in parallel with the lamp 68 to act as a load for the transistor collector currents in the event of failure of lamp 68. Diodes 66 and 69 prevent the collector current of transistor 60 (responding to ground signals) from supplying any voltage to condenser 54 which would interfere with the desired operation of relay 52.

The central station operator thereby is given a visual annunciation of activity on the line. Flashing of the lamp 68 indicates that a coded signal is being received and steady illumination thereof is an indication of trouble on circuit 10. Thus, the operator is warned that he must condition the circuits to maintain supervision of circuit 10.

In large central stations where there are many supervised circuits and consequently much activity on the switchboard, it may be desirable to provide a master annunciation lamp for a group of circuits located in a prominent position so that the illumination thereof will be certain to direct the operator's attention to a particular section of the switchboard. For this purpose, the lamp 68 of each unit to be so supervised may be connected through a diode such as diode 68′ to a common relay 68″. When relay 68″ is energized by current flowing through diode 68′ (or any corresponding diode) its contacts will close energizing master lamp 68A from power source E4. Illumination of the master lamp 68A will warn the operator to check the individual lamps 68 for indication of trouble on a particular circuit. The diode 68′ provided with each lamp 68 serves to prevent the illumination of the other lamps 68 in the group when one of their number is illuminated. Illumination of the lamp 68 does not inform the operator of the nature of the trouble. However, the nature of the trouble will be ascertained in the course of conditioning the circuits.

For this purpose, there is provided a multi-position switch 70 with positions marked to indicate the possible line conditions. Thus N indicates a normal line; O, an open line; G, a grounded line; G–O, a grounded-open line with the ground occurring before the open as the loop circuit is traced from jack 15 to jack 17; and O–G, an open-grounded line where the open occurs before the ground along the loop from jack 15 to jack 17. Switches SW1, SW2, SW3, SW4, SW5 and SW6 are all controlled from the single shaft of switch 70 and cooperate in various combinations to establish the circuit connections required for a particular trouble condition. Switch SW7 may be a separately actuated momentary push button switch. Upon observing a steady illumination of lamp 68, the operator moves the switch 70 from one position to another until the lamp 68 is extinguished. The operator then knows that the circuits have been properly conditioned to permit continued supervision and, from the position of the switch, knows the nature of the trouble on the loop circuit 10, a fact useful in the process of locating and correcting the defect.

As previously mentioned, the time constant of the condenser 29 circuit is made relatively long to allow for slow adjustment to telephone line leakage conditions and yet permit the unimpeded passage of the fast code signals. When the switch 70 is operated in response to an abnormal line condition, the condenser 29 cannot adjust itself rapidly to the change in the circuits with the result that the register 38 would run continuously for several minutes until condenser 29 stabilized. Such undesirable operation of the register is avoided by the provision of a conditioning circuit actuated by momentary operation of switch SW7.

Condenser 29 cannot condition itself rapidly due to the high input impedance of transistor 39 (about 750,000 ohms) and the high resistance of resistors 44 and 45 which may be 750,000 ohms and 1,000,000 ohms respectively. Accordingly a low resistance circuit consisting of resistors 84 and 85, which may be 1300 ohms and 680 ohms respectively, is provided in conjunction with a double pole, double throw switch SW7 one armature 86 of which acts as a push button switch to interconnect terminals 87 and 88, while the other armature 32 transfers conductor 33 to the terminal 89. Since the resistors 84, 85, 44 and 45 form a balanced bridge circuit, the same voltage appears across resistors 85 and 45. Operation of armature 86 to connect terminals 87 and 88 therefore couples the negative side of condenser 29 to resistor 85, which by virtue of its relatively low impedance produces a short time constant for condenser 29 and quickly applies the desired voltage to the condenser 29.

Since the positive side of condenser 29 is coupled to the high resistances 31 and 37, a high input resistance exists from their junction to ground. According, transistor 90, which might be an NPN transistor of the 2N1304 type and which is connected as an emitter follower, has its base connected to the junction of resistors 31 and 37. Current is supplied to the collector of transistor 90 through a resistor 91 and a conductor 91′ from potential source E3, while the transistor is biased by the voltage drop existing across a resistor 92 connected between the collector and ground. The emitter is coupled to ground through a resistor 93. When armature 32 of switch SW7 is made with terminal 89, the positive side of condenser 29 is coupled to ground through a short time constant circuit containing only resistor 93 instead of the long time constant circuit to ground through resistors 31 and 37. The voltage across resistor 93 is the same as the voltage from armature 32 to ground.

Momentary operation of the switch SW7 (after operation of switch 70) permits rapid conditioning of condenser 29 at the time switch 70 is manipulated and so prevents unnecessary running of register 38. A resistor 94 and a diode 95 provide a recharging circuit for condenser 29 from potential source E2 under normal circuit conditions.

The condition of the switches and the operation of the circuit for each type of telephone line trouble will now be described.

*Operation With Line Grounded*

With switch 70 in the ground position, switches SW1, SW2 and SW3 will be transferred to the position opposite from that shown in the drawing and SW4 will be closed. Momentary transfer of switch SW7 will prevent continued running of the register 38. The transfer of switch SW1 is of no significance when the line is simply grounded; the function thereof, however, will become apparent when the more complex circuit conditions are explained hereinafter. The transfer of armature 22 of switch SW2 to contact 71 changes the return path of telephone line 16 from the ground return resistor 23 and ground 24 to a new path through resistor 72, armature 73 of switch SW6, and resistor 74 to the positive terminal 18. The transfer of armature 34 of switch SW3 to contact 75 allows voltage changes appearing across a potentiometer 76 to be transferred to the condenser 29 and extinguishes lamp 68 by restoring voltage to the base of transistor 60 supplied from the drop existing across potentiometer 76. The closing of switch SW4 provides a shunt around contact 36 of relay 52.

Assuming a ground to exist on the loop circuit at the location indicated by 77, the circuit is now so arranged that current is supplied to both sides of the loop circuit from the positive terminal 18 of the potential source E1. Thus, one current path may be traced from terminal 18 through resistor 19, armature 78 of switch SW5, terminal 79 and armature 20 of switch SW1, resistor 21, jack 15, and out line 14 to the fault at 77. The other current path is now from terminal 18, through resistor 74, armature 73 of switch SW6, resistor 72, contact 71 and armature 22 of switch SW2, jack 17, and out line 16 to the fault at 77. The resistor 74 provides base bias voltage for a transistor 80 which might be a PNP transistor of the 2N398 type. The emitter circuit of transistor 80 includes a resistor 81 connected to the positive terminal 18. Resistor 82 and potentiometer 76 are connected in series between the collector and ground. Resistor 82 prevents the accidental removal of all resistance from the collector circuit of transistor 80 by misadjustment of potentiometer 76. The slider of potentiometer 76 is connected by a conductor 83 to contact 75 and armature 34 of switch SW3, and thence by conductor 35, closed switch SW4, resistor 37, armature 32 of switch SW3, and conductor 33 to condenser 29.

Break signals originating from a signal wheel located between jack 15 and the fault 77 will, as before, reduce the drop across base bias resistor 19 of transistor 26 thereby reducing the current in the collector circuit thereof and producing a corresponding decrease in the voltage drop across resistor 28 which causes condenser 29 to trigger the register 38 and record the signal. Break signals from a signal wheel located between jack 17 and fault 77 will reduce the bias voltage supplied by resistor 74 to transistor 80 producing a decrease in its collector current which reduces the voltage drop across potentiometer 76. The voltage decrease across potentiometer 76 is relayed via conductor 83, switch SW3, conductor 35, switch SW4, resistor 37, switch SW7, and conductor 33 to condenser 29 to operate register 38 in the usual manner. When any signal wheel in the loop circuit produces a break signal, the relay 52 is energized to open contact 36. However, switch SW4, which was previously closed, provides a shunt path around contact 36 to allow operation when the circuits are in an abnormal condition. Ground signals produced by a signal wheel have no effect when the loop circuit is grounded.

*Operation With Line Open*

Assume now that an open appears in the loop circuit at the point indicated by 96. The central station operator manipulates switch 70 until lamp 68 is extinguished with switch 70 in the "O" position. Switch SW7 is then momentarily operated to condition condenser 29 and prevent unnecessary running of the register 38. When switch 70 is in the "O" position, switches SW1, SW2, SW3, SW4, SW5 and SW6 have been transferred to the condition opposite from that shown in the drawing. As was the case when the loop circuit was grounded, positive potential from terminal 18 is applied to both lines 14 and 16, one path running through resistor 25, armature 78 of switch SW5, terminal 79 and armature 20 of switch SW1, resistor 21, jack 15, and line 14 to fault 96. The other path extends from terminal 18 through resistor 81, terminal 97 and armature 73 of switch SW6, resistor 72, terminal 71 and armature 22 of switch SW2, jack 17, and out line 16 to the fault 96. Increased current flow through resistor 25 in the emitter circuit of transistor 26 and resulting from ground signals originated by a signal wheel located between jack 15 and the fault 96 will reduce the collector current of transistor 26, producing a corresponding voltage drop across potentiometer 28 which causes condenser 29 to trigger the register 38. Similarly, resistor 81 in the emitter circuit of transistor 80 now receives loop current so that ground impulses from a signal wheel located between jack 17 and fault 96 decrease the current through the collector circuit of transistor 80 and thereby reduce the voltage drop across potentiometer 76 which causes condenser 29 to trigger register 38. The transfer of armature 98 of switch SW6 and armature 99 of switch SW5 applies base biasing voltage from adjustable resistors 100 and 101 to transistors 80 and 26, respectively, thereby enabling them to perform under maximum operating conditions. With the circuit in the open condition, break signals produced by the signal wheels have no significance, whereas the grounds intermittently applied to the line cause current to flow and operate the register. The introdutcion of resistor 25 to the emitter circuit of transistor 26 restored the voltage across resistor 28 and thus to the base of transistor 55. The base voltage of transistor 60 was restored by the substitution of resistor 76 for resistor 23 via armature 34 of switch SW3. Restoration of the base voltages switched off transistors 55 and 60 and thereby extinguished lamp 68. As before, switch SW4 shunted contact 36 to pass ground impulses to condenser 29.

*Operation With the Line Open-Grounded*

An open-grounded line is the term used to describe the condition of an open and a ground existing simultaneously on the loop circuit but with the open electrically nearer jack 15 (the high side of the circuit). Usually, such a condition will occur at a single location and might be caused by a tree falling across the telephone line and severing it. One end of the line might be left dangling from the pole and thus open, while the other was carried to the earth by the tree and so grounded. In the present instance, the open end is assumed to be nearest jack 15.

The operator turns switch 70 to the "O-G" position and momentarily operates switch SW7 to halt the register 38. With switch 70 in the "O-G" positions, switches SW1, SW2, SW3, SW4 and SW5 are transferred to the position opposite to that shown in the drawing and lamp 68 has been extinguished by the restoration of voltage to the bases of transistors 60 and 55. Switch SW4 has been closed to shunt signals around contact 36. Positive potential is again supplied to both ends of the circuit 10. One path extends through resistor 25, armature 78 of switch SW5, terminal 79 and armature 20 of switch SW1, resistor 21, and jack 15 to the open fault. The other path extends through resistor 74, armature 73 of switch SW6, resistor 72, terminal 71 and armature 22 of switch SW2, and jack 17 to the ground fault.

The operation of a signal wheel located between jack 15 and the fault will produce only ground impulses which reduce the current in the collector circuit of transistor 26 and, consequently, the voltage across potentiometer 28, which in turn causes condenser 29 to trigger the register 38. Operation of a signal wheel located between jack 17 and the fault will produce only break impulses which reduce the collector current of transistor 80 and the voltage across potentiometer 76 and consequently operates register 38 via condenser 29.

*Operation With the Line Grounded-Open*

In this situation, the ground is between jack 15 and the open. Switch 70 is set to the "G-O" position and the register is stopped by momentary operation of switch SW7. Lamp 68 has been extinguished by the restoration of the base voltages to transistors 60 and 55, as previously described. When switch 70 is in the "G-O" position, switches SW1, SW2, SW3, SW4 and SW6 are transferred to the position opposite that shown in the drawing. Positive potential is supplied from terminal 18 via resistor 19, armature 78 of switch SW5, armature 20 of switch SW1, resistor 21, and jack 15 to the ground fault and via resistor 81, terminal 97 and armature 73 of switch SW6, resistor 72, terminal 71 and armature 22 of switch SW2, and jack 17 to the open fault. Switch SW4 again shunts contact 36 to pass signals to condenser 29.

Operation of a signal wheel located between jack 15 and the ground will produce break signals only which reduce the current through resistor 19 and consequently the collector current of transistor 26, resulting in decrease in the voltage drop across potentiometer 28 which causes condenser 29 to trigger the register 38. A signal wheel located between jack 17 and the open fault will produce ground signals only which reduce the collector circuit current of transistor 80 and consequently the voltage drop across potentiometer 76 resulting in the operation of register 38 through condenser 29.

The following table shows the various switch positions for the different operating conditions:

| Condition, Switch | Normal | Ground | Open | Ground-Open | Open-Ground |
|---|---|---|---|---|---|
| SW1 | As shown | Transfer | Transfer | Transfer | Transfer. |
| SW2 | do | do | do | do | Do. |
| SW3 | do | do | do | do | Do. |
| SW4 | Open | Closed | Closed | Closed | Closed. |
| SW5 | As shown | As shown | Transfer | As shown | Transfer. |
| SW6 | do | do | do | Transfer | As shown. |
| SW7 | do | Transfer [1] | do [1] | do [1] | Transfer.[1] |

[1] Momentary.

*Operation Under All Line Conditions*

From the foregoing discussion it will be evident that under all loop conditions, normal and fault, operation of the signal recording register 38 results from a discharge current flow from capacitor 29 through the input circuit of transistor 39, which current flow results in an amplified current flow in the output circuit of transistor 41. Under normal loop conditions, capacitor 29 is maintained charged by the voltages across resistor 23 and potentiometer 28; a break signal on the loop will drop the voltage across potentiometer 28, while a ground signal on the loop will drop the voltage across resistor 23—either of which occurrences will permit a discharge current to flow from capacitor 29 (except that ground signals after the first break will be suppressed by opening of contacts 36).

For operation under all four fault conditions, resistor 23 is removed from the circuit, transistor 26 is conditioned to have a decreased output current for a signal change in current between the high side of the loop and the fault, and transistor 80 is conditioned to have a decreased output current for a signal change in current between the low side of the loop and the fault. A signal change in current will be an increase (ground) in the case of an open fault and a decrease (break) in the case of a ground fault. Since the output current flows of transistors 26 and 80 determine the voltages across potentiometers 28 and 76, respectively, and since these voltages are supplied to capacitor 29 to charge the latter, a decrease in the output current of either transistor 26 or 80 resulting from a detected signal in the loop will cause a discharge current to flow from capacitor 29 through the input circuit of transistor 39, resulting in energization of signal recording register 38.

Lightning discharges may cause induced voltages on the loop circuit which would destroy the condenser 29 and transistors 26 and 80. Therefore, a diode 102 has been provided to shunt high voltages entering via jack 15 around base resistor 19 of transistor 26. Diode 103 similarly avoids a high voltage at the base resistor 74 of transistor 80 which may enter via jack 17 when the circuits are abnormal (switch 70 in any but the "N" position). Diode 104 shunts ground return resistor 23, providing a low resistance path to ground for high voltages entering by jack 17 and so protects condenser 29.

Resistors 21 and 72 have been provided in the line portion of the circuit to limit the current therethrough and consequently protect transistors 26 and 80 in the event of a direct short between lines 14 and 16. The transistors would be endangered only if the short occurred relatively near the jacks 15 and 17 because the normal resistance of lines 14 and 16 provides protection from more distant short circuits.

Prior systems have been able to provide limited supersion in the event of a short circuit, receiving ground signals only from signal wheels located beyond the short, when the short occurred at a point no more than about one-third of the distance back to the central station from the extreme end of the loop circuit. The system of the present invention, however, is able to continue service up to about two-thirds of the distance back due to the improved sensitivity of its signal response.

As previously stated, it will be desirable to employ different values for the potential E1 depending on the length and electrical characteristics of the loop circuit. When the potential E1 is changed, adjustment must be made to keep the voltage to the condenser 29 at a constant value, e.g., about 25 volts. Such adjustments are accomplished by means of potentiometers 28 and 76 which may be ganged on a single shaft so that both may be set simultaneously. A jack 105 has been provided in association with potentiometer 76 so that a voltmeter connected between the slider of potentiometer 76 and ground will read the signal to the condenser 29. If potentiometers 76 and 28 have identical settings, as described, it will not be necessary to check the voltage at potentiometer 28.

Adjustable resistors 100 and 101, which may be ganged on a common shaft, are also adjusted simultaneously to provide the desired resistance in the base circuits of transistors 80 and 26, respectively, when switches SW6 and SW5 are in the position opposite to that shown in the drawing. A jack 106 is provided across resistor 101 so that an ohmmeter connected between the slider thereof and ground will give a direct reading of the resistance. Since resistors 100 and 101 are identical, it will not be necessary to check the resistance at resistor 100. Line currents and voltages may be determined at jacks 15 and 17, as desired.

Central station power supplies are usually storage battery banks which may be grounded at either the negative or positive side. The circuit shown in the drawings is for the more commonly used negative grounded supply. The present invention, however, is readily converted for use with a positively grounded power supply by supplying a negative potential E3 at 61 and reversing the polarity of all diodes. The transistors must also be reversed; thus the NPN types become PNP and vice versa. The following tabulation indicates the transistors which might be used with the circuit arranged for each polarity.

| Transistor | Negative Ground Circuit | Positive Ground Circuit |
|---|---|---|
| 26 | 2N398 | 2N1310. |
| 39 | 2N495 | T1492. |
| 40 | 2N1305 | 2N1304. |
| 41 | 2N1184 | 2N576A. |
| 51 | 2N1304 | 2N1305. |
| 55 | 2N1375 | 2N1304. |
| 60 | 2N1375 | 2N1304. |
| 80 | 2N398 | 2N1310. |
| 90 | 2N1304 | 2N1305. |

While the invention has been described in connection with specific embodiments thereof and in a specific use, various modifications thereof will occur to those skilled in the art without departing from the spirit and scope of the invention as set forth in the appended claims.

What is claimed is:

1. In an electrical protection system having a plurality of signalling devices connected in series in a loop circuit and being capable of successively increasing and decreasing the current flow in said loop circuit in accordance with predetermined individual signalling codes, the combination comprising a source of D.C. voltage, means including a first impedance element intercoupling one side of said source and one side of said loop, means including a second impedance element intercoupling the other side of said source and the other side of said loop whereby current flows from said source through said loop, a transistor, means to supply the voltage across said first impedance element as an input to said transistor to alter the output current of said transistor in accordance with changes in loop current, a third impedance element coupled in the output circuit of said transistor whereby the voltage across said third impedance element varies in accordance with changes in the output current of said transistor, a capacitive element, means intercoupling said second and third impedance elements and said capacitive element whereby said capacitive element is maintained charged by the voltage across said second and third impedance elements, and signal registration means coupled to said capacitive element and responsive to current flow through said capacitive element to register increases and decreases of current flow in said loop circuit.

2. In an electrical protection system having a plurality of signalling devices connected in series in a loop circuit and being capable of successively grounding and opening said loop circuit in accordance with predetermined individual signalling codes, the combination comprising a source of D.C. voltage, means including a first resistive element intercoupling one side of said source and the high side of said loop, means including a second resistive element intercoupling the other side of said source and the ground side of said loop whereby current flows from said source through said loop, a transistor, means to supply the voltage across said first resistive element as an input to said transistor to alter the output current of said transistor in accordance with changes in loop current, a third resistive element coupled in the output circuit of said transistor whereby the voltage across said third resistive element varies in accordance with changes in the output current of said first transistor, a capacitive element, means intercoupling said second and third resistive elements and said capacitive element whereby said capacitive element is maintained charged by the voltage across said second and third resistive elements, signal registration means coupled to said capacitive element and responsive to current flow through said capacitive element to register breaks and grounds in said loop circuit, and means coupled to one of said resistive elements and responsive to a voltage change thereacross resulting from one of said break and ground signals in said loop circuit to open said coupling between one of said second and third resistive elements and said capacitive element whereby subsequent ones of the other of said signals in said loop circuit are ineffective to alter the charge across said capacitor and actuate said register for a predetermined minimum time interval.

3. In an electrical protection system having a plurality of signalling devices connected in series in a loop circuit and being capable of successively grounding and opening said loop circuit in accordance with predetermined individual signalling codes, the combination comprising a source of D.C. voltage, means including a first resistive element intercoupling one side of said source and the high side of said loop, means including a second resistive element intercoupling the other side of said source and the ground side of said loop whereby current flows from said source through said loop, a first transistor, means to supply the voltage across said first resistive element as an input to said first transistor to alter the output current of said first transistor in accordance with changes in loop current, a third resistive element coupled in the output circuit of said first transistor whereby the voltage across said third resistive element varies in accordance with changes in the output current of said first transistor, a capacitive element, means intercoupling said second and third resistive elements and said capacitive element whereby said capacitive element is maintained charged by the voltage across said second and third resistive elements, signal registration means coupled to said capacitive element and responsive to current flow through said capacitive element to register breaks and grounds in said loop circuit, a second transistor, means intercoupling said third resistive element and said second transistor and arranged to change the output current of said second transistor in response to a break signal in said loop, and means responsive to said change in said output current of said second transistor to open said coupling between said second resistive element and said capacitive element whereby subsequent ground signals in said loop are ineffective to alter the charge across said capacitor and actuate said register for a predetermined minimum time interval.

4. In an electrical protection system having a plurality of signalling devices connected in series in a loop circuit and being capable of successively grounding and opening said loop circuit in accordance with predetermined individual signalling codes, the combination comprising a source of D.C. voltage, means including a first resistive element intercoupling one side of said source and the high side of said loop, means including a second resistive element intercoupling the other side of said source and the ground side of said loop whereby current flows from said source through said loop, a first transistor, means to supply the voltage across said first resistive element as an input to said first transistor to alter the output current of said first transistor in accordance with changes in loop current, a third resistive element coupled in the output circuit of said first transistor whereby the voltage across said third resistive element varies in accordance with changes in the output current of said first transistor, a capacitive element, means intercoupling said second and third resistive elements and said capacitive element whereby said capacitive element is maintained charged by the voltage across said second and third resistive elements, current responsive signal registration means, a plural stage transistor amplifier having a high impedance input circuit coupled to said capacitive element and having an output circuit coupled to said signal registration means whereby current flows through said capacitive element caused by breaks and grounds in said loop circuit are registered by said signal registration means, a second transistor, means intercoupling said third resistive element and said second transistor and arranged to change the output current of said second transistor in response to a break signal in said loop, and means responsive to said change in said output current of said second transistor to open said coupling between said second resistive element and said capacitive element whereby subsequent ground signals in said loop are ineffective to alter the charge across said capacitor and actuate said register for a predetermined minimum time interval.

5. The combination set forth in claim 4 in which the input stage of said transistor amplifier is an emitter follower having a high input impedance whereby the discharging time constant of said capacitive element is very large relative to the time duration of break and ground signals produced by said devices.

6. The combination set forth in claim 4 in which said means responsive to said change in said output current of said second transistor comprises a second capacitive element arranged to be charged by the change in output current of said second transistor, a relay coupled to said second capacitive element and arranged to be energized when said second capacitive element is charged and normally closed contacts controlled by said relay and included in said coupling between said second resistive element and said first capacitive element.

7. The combination set forth in claim 4, comprising signal indicating means, a first energizing circuit for said signal indicating means arranged to be completed in response to said change in said output current of said second transistor, a third transistor, means intercoupling said second resistive element and said third transistor and arranged to change the output current of said third transistor in response to a ground on said loop, and a second energizing circuit for said signal indicating means arranged to be completed in response to said change in said output current of said third transistor.

8. In an electrical protection system having a plurality of signalling devices connected in series in a loop circuit and being capable of successively grounding and opening said loop circuit in accordance with predetermined individual signalling codes, the combination comprising a source of D.C. voltage, means ncluding a first impedance element intercoupling one side of said source and the high side of said loop, means including a second impedance element intercoupling the other side of said source and the ground side of said loop whereby current flows from said source through said loop, a capacitive element, a first charging circuit for said capacitive element for charging said capacitive element to a value proportional to the voltage drop across said first impedance element, a second charging circuit for said capacitive element for charging said capacitive element to a value proportional to the voltage drop across said second impedance element, an amplifier having input and output circuits, signal registration means coupled to the output circuit of said amplifier, and means intercoupling the input circuit of said amplifier and said capacitive element whereby current flow through said capacitive element caused by changes in the voltages across said impedance elements resulting from respective break and ground signals in said loop circuit produces current flow in the output circuit of said amplifier thereby to operate said signal registration means.

9. The combination set forth in claim 8, comprising means responsive to a selected change in the voltage drop across one of said impedance elements to suppress registration of subsequent signal changes in the voltage across the other of said impedance elements for a predetermined minimum time interval.

10. In an electrical protection system having a plurality of signalling devices connected in series in a loop circuit and being capable of successively grounding and opening said loop circuit in accordance with predetermined individual signalling codes, the combination comprising a source of D.C. voltage, means including a first impedance element intercoupling one side of said source and the high side of said loop, means including a second impedance element intercoupling the other side of said source and the ground side of said loop whereby current flows from said source through said loop, a capacitive element, a first charging circuit for said capacitive element for charging said capacitive element to a value proportional to the voltage drop across said first impedance element, a second charging circuit for said capacitive element for charging said capacitive element to a value proportional to the voltage drop across said second impedance element, a plural stage transistor amplifier having a high impedance input circuit coupled to said capacitive element and arranged so that a discharge current flow through said capacitive element tends to produce a current flow in the output circuit of said amplifier, current responsive signal registration means coupled to the output circuit of said amplifier, and means to prevent current flow in said output circuit of said amplifier for a discharge current flow through said capacitive element below a predetermined value corresponding to the discharge current resulting from break and ground signals in said loop circuit.

11. In an electrical protection system having a plurality of signalling devices connected in series in a loop circuit and being capable of successively grounding and opening said loop circuit in accordance with predetermined individual signalling codes, the combination comprising a source of voltage having a grounded side and a high side, selectively operable means intercoupling the high and ground sides of said source and the high and low sides of said loop, respectively, under normal loop conditions and the high side of said source and both sides of said loop under loop fault conditions, a capacitive element, charging means for said capacitive element, said charging means including circuit elements operatively coupled to said loop and being responsive to the current flow in said loop and being arranged to maintain said capacitive element in a predetermined state of charge in the absence of a signal change of current in said loop and to permit a current to flow through said capacitive element upon the occurrence of a signal change in current in said loop, an amplifier having an input circuit coupled to said capacitive element and being responsive to said current flow through said capacitive element to produce a current flow in the output circuit of said amplifier, and signal registration means coupled to the output circuit of said amplifier and being responsive to said current flow therein to register signals in said loop circuit.

12. In an electrical protection system having a plurality of signalling devices connected in series in a loop circuit and being capable of successively grounding and opening said loop circuit in accordance with predetermined individual signalling codes, the combination comprising a source of voltage having a grounded side and a high side, selectively operable means intercoupling the high and ground sides of said source and the high and low sides of said loop, respectively, under normal loop conditions and the high side of said source and both sides of said loop under loop fault conditions, a capacitive element, charging means for said capacitive element, said charging means including circuit elements operatively coupled to said loop and being responsive to the current flow in said loop and being arranged to maintain said capacitive element in a predetermined state of charge in the absence of a signal change of current in said loop and to permit a current to flow through said capacitive element upon the occurrence of a signal change in current in said loop, conditioning means operatively connected to said charging means and selectively operable to render said charging means responsive to signal current changes in said loop circuit under different loop fault conditions, an amplifier having an input circuit coupled to said capacitive element and being responsive to said current flow through said capacitive element to produce a current flow in the output circuit of said amplifier, and signal registration means coupled to the output circuit of said amplifier and being responsive to said current flow therein to register signals in said loop circuit.

13. In an electrical protection system having a plurality of signalling devices connected in series in a loop circuit and being capable of successively grounding and opening said loop circuit in accordance with predetermined individual signalling codes, the combination comprising a source of D.C. voltage having a grounded side and a high side, selectively operable means intercoupling the high and ground sides of said source and the high and low sides of said loop, respectively, under normal loop conditions and the high side of said source and both sides of said loop under loop fault conditions, a capacitive element, a plurality of charging circuits for said capacitive element, said charging circuits being operatively coupled to said loop and being responsive to the current flow in said loop and being arranged to maintain said capacitive element charged in the absence of a signal change of current in said loop and to permit a discharge current to flow through said capacitive element upon the occurrence of a signal change in current in said loop, conditioning means operatively connected to said charging circuits and selectively operable to render said charging circuits responsive to signal current changes in said loop circuit under different loop fault conditions, manually operable means operatively associated with said capacitive element and being arranged to stabilize the charge on said capacitive element upon operation of said conditioning means, an amplifier having an input circuit coupled to said capacitive element and being responsive to discharge current flow through said capacitive element to produce a current flow in the output circuit of said amplifier, and signal registration means coupled to the output circuit of said amplifier and being responsive to said current flow therein to register signals in said loop circuit.

14. In an electrical protection system having a plurality of signalling devices connected in series in a loop circuit and being capable of successively grounding and opening said loop circuit in accordance with predetermined individual signalling codes, the combination comprising a source of D.C. voltage having a grounded side and a high side, selectively operable means intercoupling the high and ground sides of said source and the high and low sides of said loop, respectively, under normal loop conditions and the high side of said source and both sides of said loop under loop fault conditions, a capacitive element, a first charging circuit for said capacitive element and comprising a resistive element coupled to the low side of said loop, a second charging circuit for said capacitive element and comprising a first transistor coupled to the high side of said loop, a third charging circuit for said capacitive element and comprising a second transistor coupled to the low side of said loop, said charging circuits being responsive to the current flow in said loop and being arranged to maintain said capacitive element charged in the absence of a signal change of current in said loop and to permit a discharge current to flow through said capacitive element upon the occurrence of a signal change in current in said loop, conditioning means operatively connected to said charging circuits and selectively operable to render selected ones of said charging circuits responsive to signal current changes in said loop circuit under different loop fault conditions, an amplifier having an input circuit coupled to said capacitive element and being responsive to discharge current flow through said capacitive element to produce a current flow in the output circuit of said amplifier, and signal registration means coupled to the output circuit of said amplifier and being responsive to said current flow therein to register signals in said loop circuit.

15. In an electrical protection system having a plurality of signalling devices connected in series in a loop circuit and being capable of successively grounding and opening said loop circuit in accordance with predetermined individual signalling codes, a source of D.C. voltage having a high side and a ground side, first conditionable switching means for selectively coupling said high and ground sides of said source to the high and low sides of said loop, respectively, for operation under normal loop conditions and coupling said high side of said source to both sides of said loop for operation under loop fault conditions, a first resistive element, second conditionable switching means arranged to interpose said first resistive element between the ground side of said source and the low side of said loop under normal loop conditions, a first transistor, a second resistive element coupled in the output circuit of said first transistor, third conditionable switching means intercoupling the input circuit of said first transistor and the high side of said loop and arranged so that the output current of said first transistor will decrease for an open signal in said loop under normal loop conditions and will decrease for a signal change in current between the high side of said loop and a fault under fault conditions in said loop, a second transistor, a third resistive element coupled in the output circuit of said second transistor, fourth conditionable switching means intercoupling the input circuit of said second transistor and the low side of said loop under fault conditions and arranged so that the output current of said second transistor will decrease for a signal change in current between the low side of said loop and a fault under fault conditions in said loop, a capacitive element, conditionable means intercoupling said first and second resistive elements and said capacitive element under normal loop conditions and arranged so that said capacitive element will be charged by the voltage across said first and second resistive elements, conditionable means intercoupling said second and third resistive elements and said capacitive element under fault conditions in said loop and arranged so that said capacitive element will be charged by the voltages across said second and third resistive elements, manually operable means for conditioning each of said conditionable switching means and each of said conditionable means for operation under normal loop conditions and under loop fault conditions, a transistor amplifier having an input circuit coupled to said capacitive element, said transistor amplifier being arranged so that current will flow in the output circuit thereof when a signal change in current in said loop decreases the voltage across one of said resistive elements to permit a discharge current to flow from said capacitive element through said input circuit of said transistor amplifier, and current sensitive signal registration means included in said output circuit of said transistor amplifier.

16. The combination set forth in claim 15 in which the time constants of said charging circuits are each many times the time duration of individual loop current changes in said signalling code and in which there is provided means including a manually operable switching element for temporarily reducing the effective charging time constant of said capacitive element to stabilize the charge on said capacitive element upon operation of said manually operable means.

References Cited in the file of this patent

UNITED STATES PATENTS

| | | |
|---|---|---|
| 1,522,581 | Espenschied | Jan. 13, 1925 |
| 1,571,368 | Chireix | Feb. 2, 1926 |
| 2,651,022 | Shelley | Sept. 1, 1953 |
| 2,719,289 | Barstow | Sept. 27, 1955 |
| 2,917,730 | Fredericks | Dec. 15, 1959 |
| 2,971,183 | Gill et al. | Feb. 7, 1961 |